United States Patent
Graney

(10) Patent No.: US 10,246,102 B2
(45) Date of Patent: Apr. 2, 2019

(54) SYSTEMS AND METHODS FOR IMPLEMENTING USER PREFERENCES FOR VEHICLES

(71) Applicant: GM GLOBAL TECHNOLOGY OPERATIONS LLC, Detroit, MI (US)

(72) Inventor: Matthew Graney, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 100 days.

(21) Appl. No.: 15/459,805

(22) Filed: Mar. 15, 2017

(65) Prior Publication Data

US 2018/0265094 A1 Sep. 20, 2018

(51) Int. Cl.
| | |
|---|---|
| *B60W 10/30* | (2006.01) |
| *B60W 50/00* | (2006.01) |
| *G05D 1/00* | (2006.01) |
| *B60W 50/10* | (2012.01) |
| *G05D 1/02* | (2006.01) |
| *B60W 40/08* | (2012.01) |

(52) U.S. Cl.
CPC ........ *B60W 50/0098* (2013.01); *B60W 10/30* (2013.01); *B60W 40/08* (2013.01); *B60W 50/10* (2013.01); *G05D 1/0088* (2013.01); *G05D 1/0287* (2013.01); *B60W 2040/0809* (2013.01); *B60W 2540/04* (2013.01); *B60W 2710/30* (2013.01)

(58) Field of Classification Search
CPC .. B60W 50/0098; B60W 10/30; B60W 40/08; B60W 50/10; B60W 2040/0809; B60W 2540/04; B60W 2710/30; G05D 1/0088; G05D 1/0287
See application file for complete search history.

(56) References Cited

U.S. PATENT DOCUMENTS

| | | | |
|---|---|---|---|
| 7,319,924 | B2 | 1/2008 | Ampunan et al. |
| 7,616,943 | B2 | 11/2009 | Oesterling |
| 7,720,486 | B2 | 5/2010 | Ross et al. |
| 7,840,322 | B2 | 11/2010 | Ross et al. |
| 8,468,057 | B2 | 6/2013 | Ross et al. |
| 9,108,579 | B2 | 8/2015 | Camacho et al. |
| 2017/0061965 | A1* | 3/2017 | Penilla ............... H04L 67/12 |
| 2017/0140757 | A1* | 5/2017 | Penilla ............... H04L 67/12 |
| 2017/0285642 | A1* | 10/2017 | Rander ............... G05D 1/021 |
| 2017/0294130 | A1* | 10/2017 | Donnelly ............ G08G 1/202 |
| 2017/0316696 | A1* | 11/2017 | Bartel ................. G08G 1/202 |
| 2018/0061415 | A1* | 3/2018 | Penilla ............... H04L 67/12 |
| 2018/0111494 | A1* | 4/2018 | Penilla ................ H02J 7/02 |

\* cited by examiner

*Primary Examiner* — McDieunel Marc
(74) *Attorney, Agent, or Firm* — Lorenz & Kopf LLP

(57) ABSTRACT

Systems and method are provided for implementing user preferences for vehicles. In one embodiment, a method for implementing user preferences for vehicles includes receiving preferences of a user with respect to vehicle settings pertaining to a plurality of vehicles; and implementing, via instructions provided by a processor, the user's preferences for the vehicle settings when a user is set to occupy a vehicle of the plurality of vehicles.

20 Claims, 5 Drawing Sheets

SYSTEMS AND METHODS FOR IMPLEMENTING USER PREFERENCES FOR VEHICLES

TECHNICAL FIELD

The present disclosure generally relates to vehicles, and more particularly relates to systems and methods for implementing user preferences for vehicles, such as a user's climate and entertainment preferences for autonomous vehicles.

BACKGROUND

Vehicles today have many options for users, for example with respect to climate and entertainment settings for the vehicle. These include autonomous vehicles. An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While vehicles, including autonomous vehicles, provide with users with many options, for example with respect to climate and entertainment options, it may be possible to further improve the implementation of a user's preferences with respect to such options. This may be particular the case with respect to taxis, ride share services, and/or other applications in which a driver may not always drive the same vehicle.

Accordingly, it is desirable to provide systems and methods for improved implementation of user preferences, for example with respect to climate and entertainment options.

SUMMARY

Systems and methods are provided for implementing user preferences for vehicles. In one embodiment, a method for implementing user preferences for vehicles comprises receiving preferences of a user with respect to vehicle settings pertaining to a plurality of vehicles; and implementing, via instructions provided by a processor, the user's preferences for the vehicle settings when a user is set to a vehicle of the plurality of vehicles.

In one embodiment, a system for implementing user preferences for vehicles comprises a preference-related object module and a preference-related determination module. The preference-related object module is configured to receive preferences of a user with respect to vehicle settings pertaining to a plurality of vehicles. The preference-related determination module includes a processor, and is configured to implement the user's preferences for the vehicle settings when a user is set to occupy a vehicle of the plurality of vehicles.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
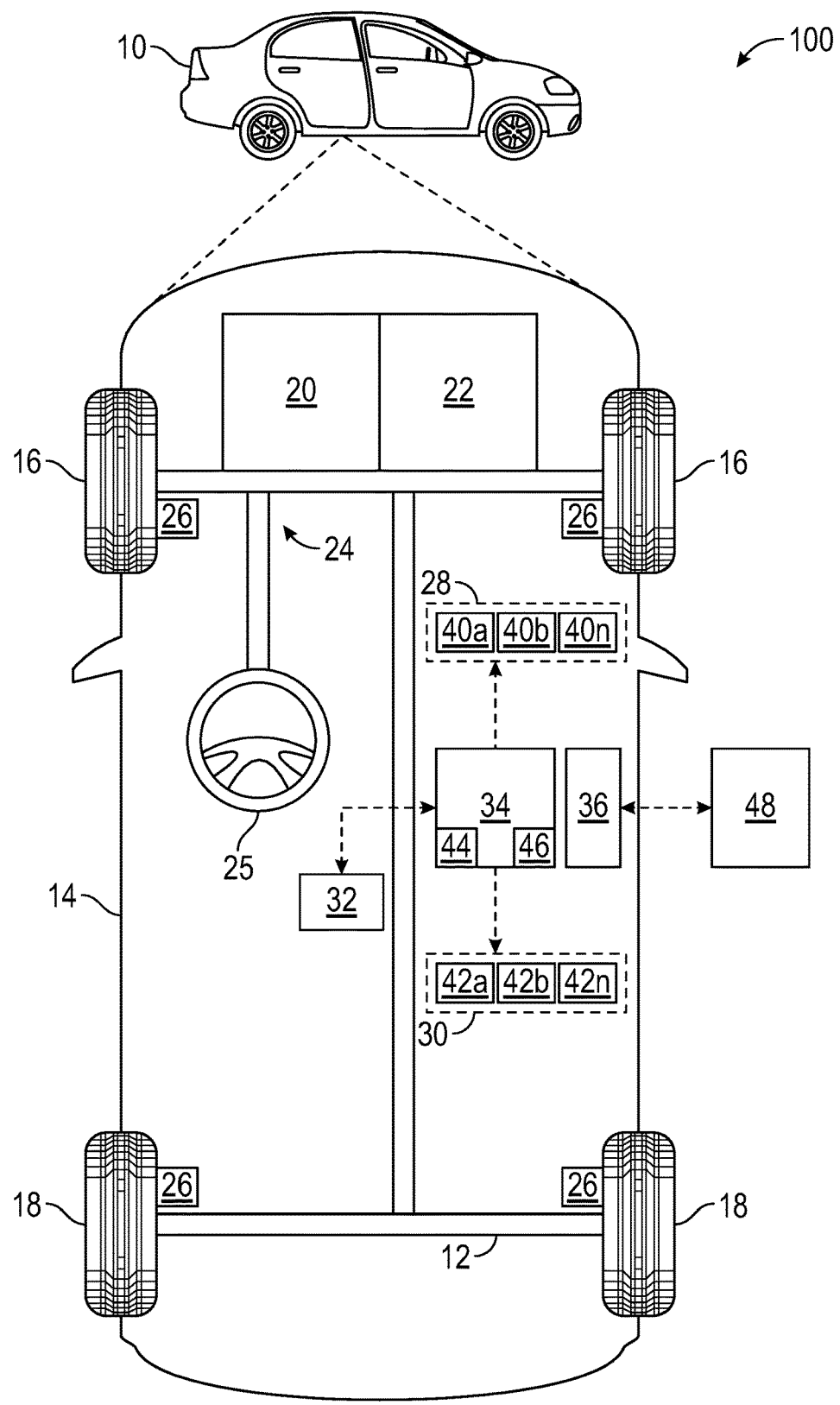
FIG. 1 is a functional block diagram illustrating an autonomous vehicle having a user preference implementation system, in accordance with various embodiments.

With reference to FIG. 1, a user preference implementation system 100 shown generally as 100 is associated with a vehicle 10 in accordance with various embodiments. In general, the user preference implementation system (or simply "system") 100 receives a user's preferences for various settings (e.g., including for climate and entertainment systems) for a plurality of vehicles, including the vehicle 10, and implements the user's preferences for the vehicle 100. As used in this Application, the terms "user" and "individual" are considered to be synonymous unless indicated otherwise.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the user preference implementation system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous or other vehicle that utilizes vehicle systems requiring user inputs for control thereof.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured for use in implementing user preferences for operating one or more systems (e.g. a climate control system and/or an entertainment system) of the vehicle 10. In one embodiment, controller 34 is configured to identify a user of the vehicle 10 along with user preferences for the particular user for use in a plurality of vehicles, and for implementing the user's preferences when the user is operating the vehicle 10.

Figure 2:
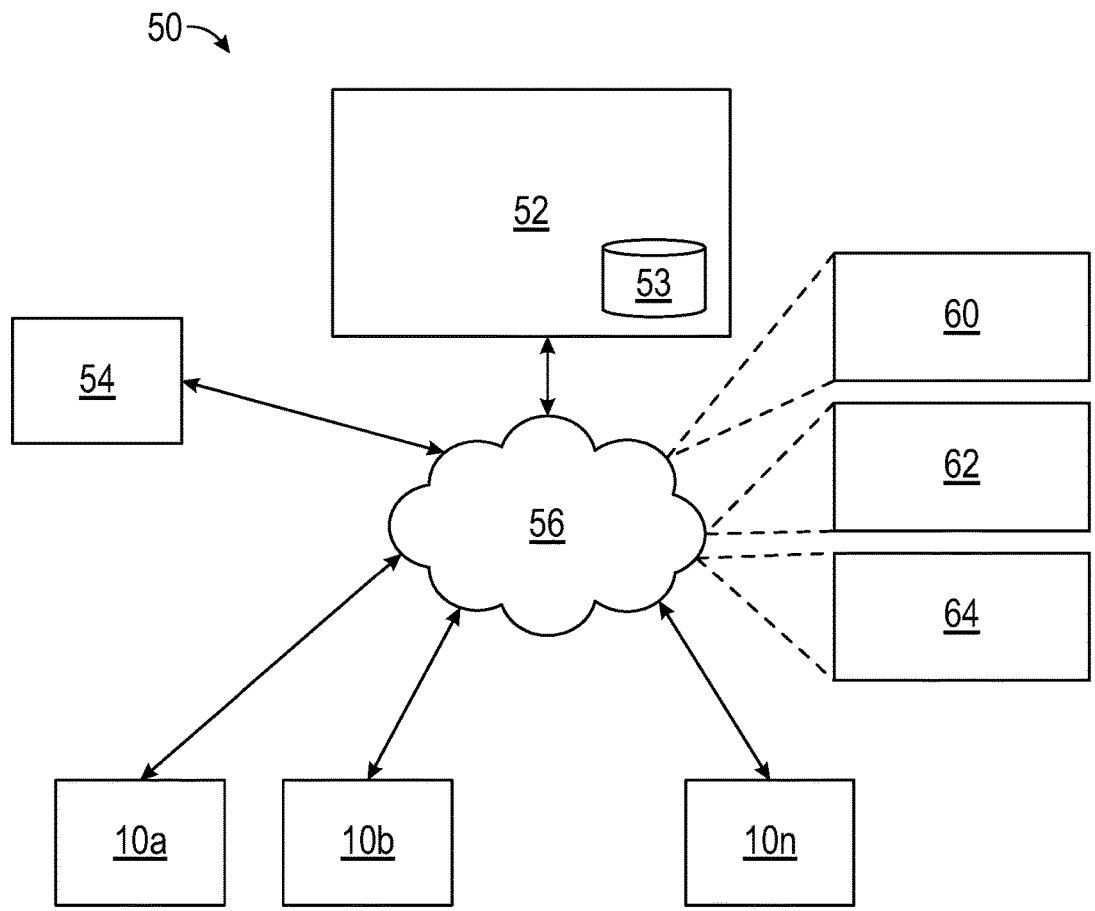
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information. In one embodiment, as described in further detail below, remote transportation system 52 includes a route database 53 that stores information relating to navigational system routes, including whether and to what extent particular route segments are impacted by construction zones or other possible hazards or impediments that have been detected by one or more of autonomous vehicles 10a-10n.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
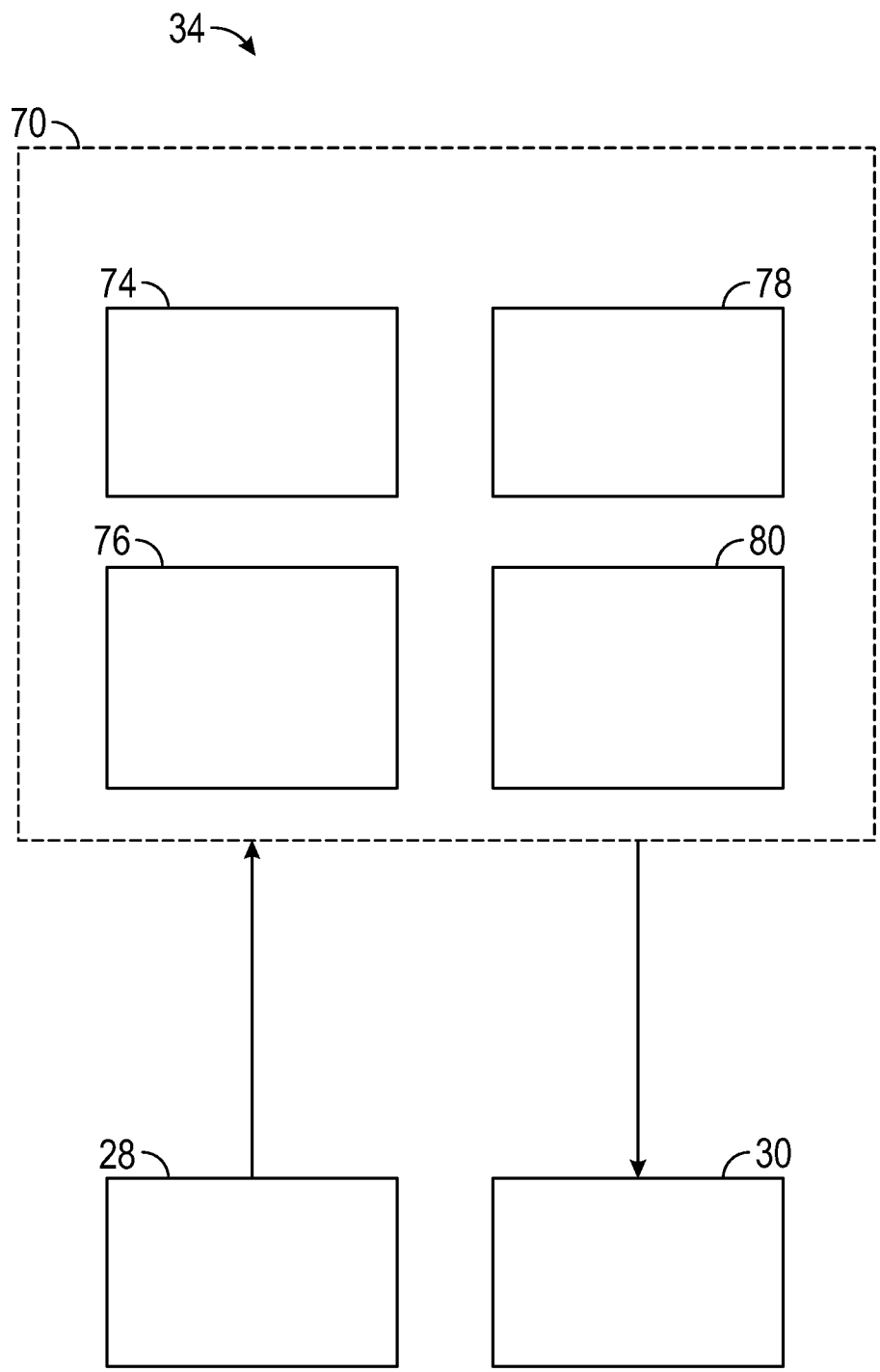
FIG. 3 is functional block diagram illustrating an autonomous driving system (ADS) associated with an autonomous vehicle, in accordance with various embodiments.

In accordance with various embodiments, controller 34 implements an autonomous driving system (ADS) as shown in FIG. 3. That is, suitable software and/or hardware components of controller 34 (e.g., processor 44 and computer-readable storage device 46) are utilized to provide an ADS that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
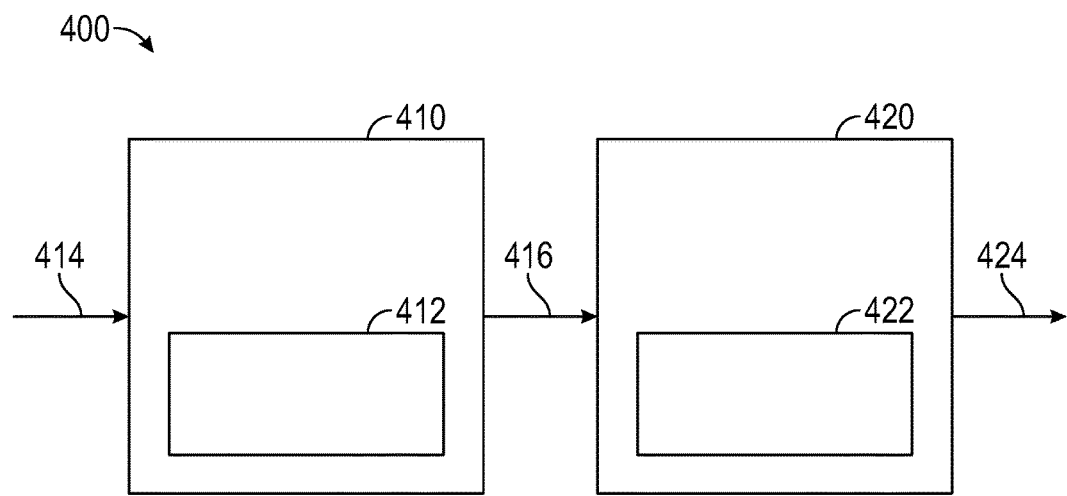
FIG. 4 is a dataflow diagram illustrating a preference implementation system of the autonomous vehicle, in accordance with various embodiments.
Figure 5:
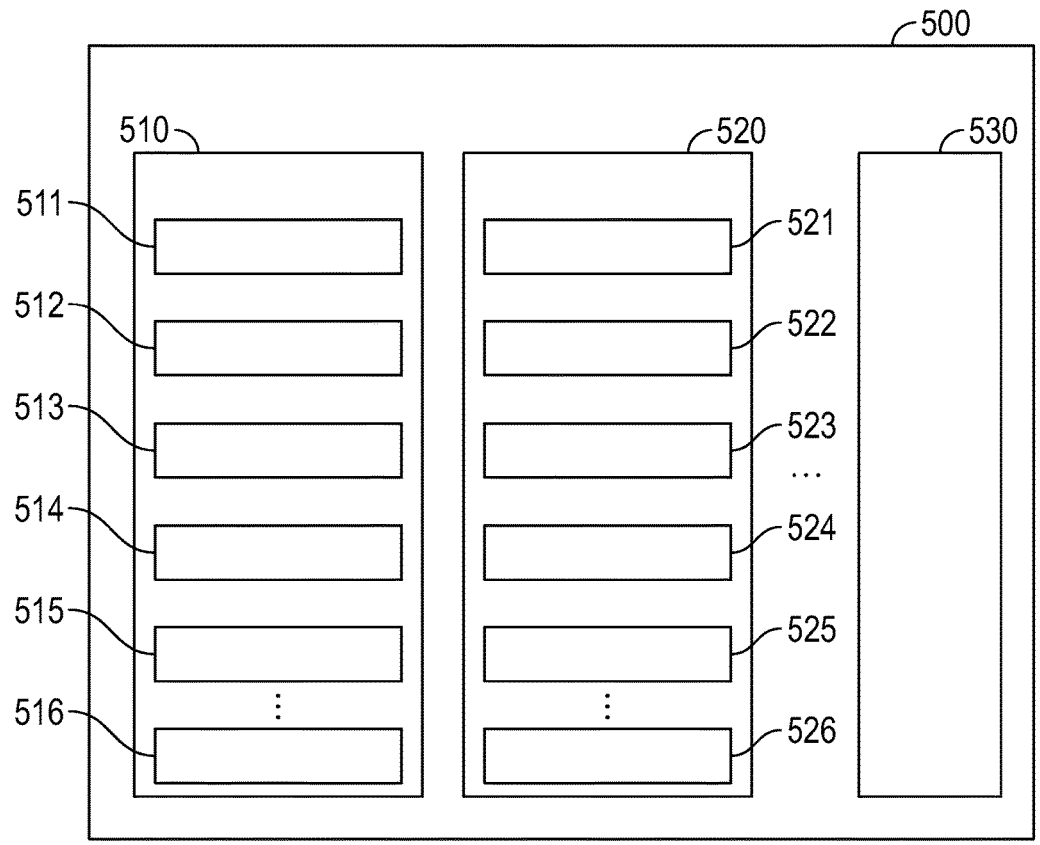
FIG. 5 is a block diagram of exemplary user preferences for environment and entertainment systems for vehicles, including the autonomous vehicle, in accordance with various embodiments.
Figure 6:
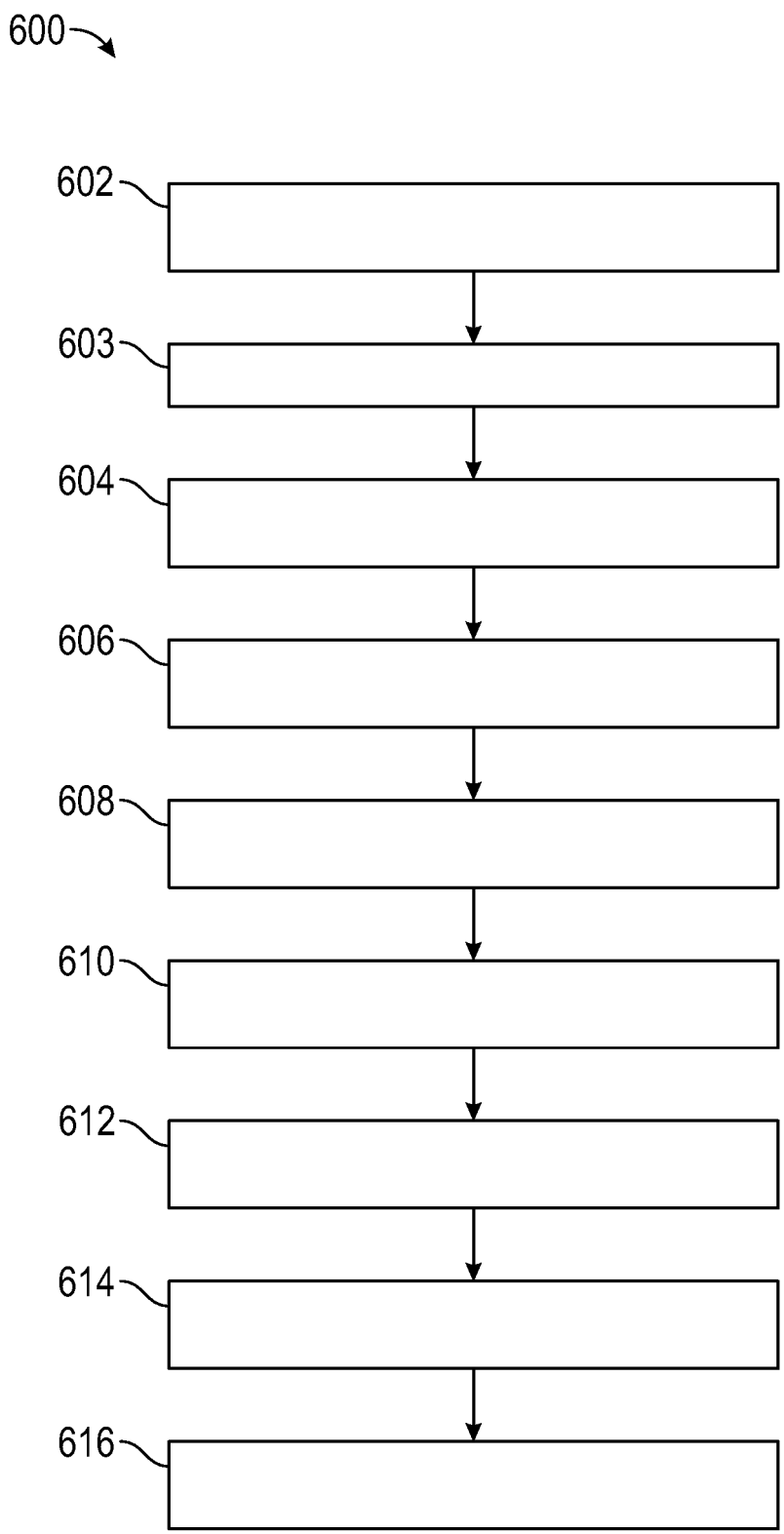
FIG. 6 is a flowchart for a control process for implementing user preferences for vehicles, including the autonomous vehicle, in accordance with various embodiments.

With reference back to FIG. 1, in various embodiments, one or more instructions of the controller 34 are embodied in the user preference implementation system 100 of FIG. 1. As mentioned briefly above, the user preference implementation system 100 of FIG. 1 receives a user's preferences for various settings (e.g., including for climate and entertainment systems) for a plurality of vehicles, including the vehicle 10, and implements the user's preferences for the vehicle 100. In that regard, FIG. 4 is a dataflow diagram illustrating a preference implementation system of the autonomous vehicle, in accordance with various embodiments. FIG. 5 is a block diagram of exemplary user preferences for environment and entertainment systems for vehicles, including the autonomous vehicle, in accordance with various embodiments. FIG. 6 is a flowchart for a control process for implementing user preferences for vehicles, including the autonomous vehicle, in accordance with various embodiments.

Referring to FIG. 4, an exemplary user preference implementation system 400 generally includes a preference-related object module 410 and a preference-related determination module 420. In the depicted embodiment, the preference-related object module 410 includes an interface 412 (e.g., a receiver or transceiver) that receives inputs 414 from one or more other data sources pertaining to the user preferences, and provides outputs 416 to the preference-related determination module 420 for implementation in the vehicle 10. In various embodiments, the interface (e.g. transceiver) 412 of FIG. 4 communicates wireless with the user device 54 of FIG. 2 (e.g. a smart phone or other electronic device of the user) and/or with the autonomous vehicle based remote transportation system 52 of FIG. 2 via the communication network 56 of FIG. 2. In one embodiment, the preference implementation system 400 is part of the controller 34 described above in connection with FIG. 1.

With reference to FIG. 5, an exemplary set of user preferences 500 is depicted for an exemplary user (or individual), in accordance with exemplary embodiments. In various embodiments, the user preferences 500 are specific to a particular individual or user. Also in various embodiments, the user preferences 500 apply, for the particular individual or user, preferences for settings (e.g. for climate control and entertainment) for use by the user for a plurality of vehicles. For example, in various embodiments, the user preferences 500 correspond to the particular user's preferences for whenever the user occupies or occupies any of the autonomous vehicles 10*a*, 10*b*, . . . 10*n* of FIG. 2. Accordingly, in various embodiments, the user preferences are portable for the user across the various vehicles.

With continued reference to FIG. 5, in one embodiment the user preferences 500 include climate preferences 510 and entertainment preferences 520. In various embodiments, the climate preferences 510 pertain to one or more climate control systems and/or functionality of the vehicle 10, for example air conditioning systems, heating systems, seat warming systems, and so on. Also in various embodiments, the entertainment preferences 520 pertain to one or more entertainment systems and/or functionality of the vehicle 10, for example radio, compact disks, dvds, digital music, movie, video, and/or other content players, content streaming, and so on. In certain embodiments, the associated climate control system(s) and entertainment system(s) may be part of the vehicle control module 94 of FIG. 1. In certain other embodiments, the climate control system(s) and entertainment system(s) may comprise and/or be part of and/or coupled to one or more other (e.g. non-depicted) vehicle devices, systems, and/or sub-systems.

In the depicted embodiment of FIG. 5, the climate preferences 510 include temperature preferences 511, fan preferences 512, recirculation preferences 513, power preferences 514, and seat warmer preferences 515. These may vary in certain embodiments. In addition, in certain embodiments the climate preferences 510 may also include one or more other climate preferences 516.

In certain embodiments, the temperature preferences 511 may comprise one or more temperature values for an air conditioning and/or heating system as desired by the user. For example, in certain embodiments, the temperature preferences 511 may include a most recent temperature setting for the user (e.g. the last time that the user was occupying a vehicle). The temperature preferences 511 may also include one or more average temperature settings for the user (e.g. an average temperature value for various recent times in which the user has occupied a vehicle). Also in certain embodiments, the temperature preferences 511 may include a weighting factor for this particular user, taking into account other parameters (e.g. as to whether the particular user prefers the temperature to be relatively colder or warmer in relation to an outside ambient temperature as compared with other users, and so on), among other possible variations.

In certain embodiments, the fan preferences 512 may comprise one or more fan setting values for a fan of an air conditioning and/or heating system as desired by the user. For example, in certain embodiments, the fan preferences 512 may include a most recent fan setting for the user (e.g. the last time that the user was occupying a vehicle). The fan preferences 512 may also include one or more average fan settings for the user (e.g. an average fan setting value for various recent times in which the user has occupied a vehicle). Also in certain embodiments, the fan preferences 512 may include a weighting factor for this particular user, taking into account other parameters (e.g. as to whether the particular user prefers different fan setting values in relation to an outside ambient temperature as compared with other individuals, and so on), among other possible variations. In addition, in certain embodiments, the fan preferences 512 may pertain to a particular fan setting (e.g., low, medium, or high). In other embodiments, the fan preferences 512 may also include an amount of time for a particular fan setting (e.g. an amount of time in which the fan setting is initially at "high" before being reduced to "low", and so on).

In certain embodiments, the recirculation preferences 513 may comprise a user's history or preferences with respect to a recirculation button for the climate control system (e.g. as to whether or not recirculated air, from within a cabin of the vehicle, is to be used by the climate control system). For example, in certain embodiments, the recirculation preferences 513 may include a most recent recirculation button setting for the user (e.g. the last time that the user was occupying a vehicle). The recirculation preferences 513 may also include one or more typical settings for the user (e.g. the setting for the recirculation control button that has most often been utilized by the user for various recent times in which the user has occupied a vehicle).

In certain embodiments, the power preferences 514 may comprise a user's history or preferences with respect to a power button for the climate control system (e.g. as to whether or not the climate control system is turned on). For example, in certain embodiments, the power preferences 514 may include a most recent power setting for the climate control system (e.g. the last time that the user was occupying a vehicle). The power preferences 514 may also include one or more typical settings for the user (e.g. the setting for the power button for the climate control system that has most often been utilized by the user for various recent times in which the user has occupied a vehicle).

In certain embodiments, the seat warmer preferences 515 may comprise one or more setting values for a seat warmer (e.g. for a driver and/or passenger heated seat system) as desired by the user. For example, in certain embodiments, the seat warmer preferences 515 may include one or more recent seat warmer settings for the user (e.g. the last time that the user was occupying a vehicle). The seat warmer preferences 515 may also include one or more average seat warmer settings for the user (e.g. an average seat warmer setting value for various recent times in which the user has occupied a vehicle). Also in certain embodiments, the seat warmer preferences 515 may include a weighting factor for this particular user, taking into account other parameters (e.g. as to whether the particular user prefers different seat warmer setting values in relation to an outside ambient temperature as compared with other individuals, and so on), among other possible variations. In addition, in certain embodiments, the seat warmer preferences 515 may pertain to a particular temperature or intensity setting for the sear warmer (e.g. "low" or "high"). In other embodiments, the seat warmer preferences 515 may also include an amount of time that the seat warmer remains on and/or an amount of time before the seat warmer setting remains in a particular level (e.g. before automatically turning off, or turning from a "high" setting to a "low" setting, and so on).

Also in various embodiments, the climate preferences 510 may include any number of other preferences related to climate control for vehicles. For example, in certain embodiments, the climate preferences 510 may also include other options that may be available for vehicle climate control systems, such as vent selection, direction of air flow through the vents, air conditioning and heating options, and so on.

Also in the depicted embodiment of FIG. 5, the entertainment preferences 520 include a current selection preference 521, stored content preferences 522, radio preferences 523, streaming preferences 524, and volume preferences 525. In addition, in certain embodiments the entertainment preferences 520 may also include one or more other entertainment preferences 526.

In various embodiments, the current selection preference 521 refers to one or more current selections that are currently being utilized by the user. For example, in certain embodiments, the current selection preference 521 refers to a particular song, movie, video, or other content, or a sequence of such content (e.g. a current playlist) that is playing on a smart phone or other electronic device of the user (e.g. corresponding to user device 54 of FIG. 2).

In various embodiments, the stored content preferences 522 refer to other content of the user. For example, in certain embodiments, the stored content preferences 522 refers to other songs, selections, movies, videos, or other content (other than the current selection(s) of the current selection preference 521) that are stored for the user, such as on a smart phone or other electronic device of the user (e.g. corresponding to user device 54 of FIG. 2).

In various embodiments, the radio preferences 523 refer to radio selections of the user. For example, in certain embodiments, the radio preferences 523 refer to preferred radio stations of the user. By way of additional example, in certain embodiments, the radio preferences 523 refer to preferred types of radio stations (e.g., country music, rock music, sports, news, weather, and so on) preferred by the user. In certain embodiments, the radio preferences 523 may refer to specific radio stations or genres of radio stations that the user has recently listened to (in the current vehicle 10 and/or in other vehicles). In certain other embodiments, the radio preferences 523 may refer to preferred radio stations or genres of radio stations that the user has previously indicated as preferred radio stations (e.g. as previously entered on the user's smart phone or other electronic device).

In various embodiments, the streaming preferences 524 refer to streaming selections of the user. For example, in certain embodiments, the streaming preferences 524 refer to preferred sources of streaming audio and/or video content (e.g., music, movies, videos, and/or other audio and/or visual content) for the user. By way of additional example, in certain embodiments, the streaming preferences 524 refer to specific types and/or other genres of streaming content (e.g. country music, rock music, sports, news, weather, and so on) preferred by the user. In certain embodiments, the streaming preferences 524 may refer to specific sources of streaming content (or genres of streaming content) that the user has recently listened to (in the current vehicle 10 and/or in other vehicles). In certain other embodiments, the streaming preferences 524 may refer to preferred sources or genres of streaming content that the user has previously indicated as preferred (e.g. as inputted in the user's smart phone or other electronic device).

Returning back to FIG. 4, also in the depicted embodiment, the preference-related determination module 420 includes a processor 422. The outputs 416 from the preference-related object module 410 serve as inputs for the preference-related determination module 420, and are analyzed by the processor 422. In various embodiments, the processor 422 generates outputs 424 that comprise specific settings for systems of the vehicle 10 (e.g., for climate control and entertainment) based on the user inputs. For example, in various embodiments, the user preferences 500 of FIG. 5 (e.g. the various climate preferences 510 and entertainment preferences 520 of FIG. 5) comprise the inputs 416 for the preference-related determination module 420 of FIG. 4, and the processor 422 thereof determines settings for the climate and entertainment systems (e.g., temperature, fan, recirculation, power, and seat warmer settings for the climate control system, current selection, stored content, radio, streaming, and volume settings for the entertainment system, and so on) based on these inputs 416.

Referring now to FIG. 6, and with continued reference to FIGS. 1-5, a flowchart illustrates a control method 600 that can be performed by the system 100 and the associated implementations of FIGS. 1-5, in accordance with an exemplary embodiment of the present disclosure. As can be appreciated in light of the disclosure, the order of operation within the method is not limited to the sequential execution as illustrated in FIG. 6, but may be performed in one or more varying orders as applicable and in accordance with the present disclosure. In various embodiments, the control method 600 can be scheduled to run based on one or more predetermined events, and/or can run continuously during operation of the autonomous vehicle 10.

In various embodiments, the control method 600 may begin at 602, in which user preferences are generated. Specifically, in various embodiments, user-provided inputs are received as to preferences of the user for whenever the user is present within one of a plurality of vehicles, such as the autonomous vehicles 10a, 10b, . . . 10n of FIG. 1 (and including vehicle 10 of FIG. 1, among other vehicles). In various embodiments, the user-provided inputs of 602 correspond to climate preferences, entertainment preferences, and other preferences, for example corresponding to the various exemplary types of user preferences provided in FIG. 5 and discussed above in connection therewith. In certain embodiments, the user preferences may be generated at least in part based on interaction with the preference-related object module 410 of FIG. 4 and/or the autonomous vehicle based remote transportation system 52 of FIG. 2, for example in combination with the user and/or the user device 54 of FIG. 2.

Also in various embodiments, the user may provide such inputs at 602 via the user's smart phone, desktop computer, laptop computer, and/or other electronic devices (e.g. corresponding to the user device 54 of FIG. 1). Also in certain embodiments, the user may provide inputs directly to one or more of the vehicles (e.g. autonomous vehicles 10a, 10b, . . . 10n of FIG. 2), for example via a user input screen. In addition, in various other embodiments, the user inputs may be generated by a processor of one or more of the vehicles 10a, 10b, . . . 10n of FIG. 2, and/or of the autonomous vehicle based remote transportation system 52 of FIG. 2, for example by monitoring the user's usage of various controls (e.g. corresponding to the types of controls pertaining to the climate control system, the entertainment system, and/or other systems corresponding to the user preferences 500 of FIG. 5) when the user is disposed in various of the vehicles 10a, 10b, . . . 10n of FIG. 2.

In various embodiments, the user preferences are stored in memory at 603. Specifically, in various embodiments, the user preferences of 602 are stored in one or more computer memory locations at 603. In various embodiments the user preferences are stored in a memory outside of, or remote from, the vehicle 10 of FIG. 1. For example, in one embodiment, the user preferences are stored in a memory of the user's smart phone or other electronic device (e.g. corresponding to the user device 54 of FIG. 2). In certain other embodiments, the user preferences are stored in a memory of the autonomous vehicle based transportation system 52.

The user is identified at 604. In various embodiments, an association is made at 604 between a particular user and a particular vehicle for which the user is presently occupying or about to occupy. In certain embodiments, the identification of 604 pertains to an association between the user and a particular vehicle out of a fleet of vehicles, such as a taxi service and/or fleet of autonomous vehicles (e.g., the fleet of vehicles 10a, 10b, . . . 10n of FIG. 2). Also in certain embodiments, the identification of 604 is made at least in part via a processor, such as the processor 422 of FIG. 4, the processor 44 of FIG. 1, and/or a processor of the autonomous vehicle based remote transportation system 52 of FIG. 2.

In certain embodiments, the identification of 604 is made when the user enters the vehicle. For example, in certain embodiments, the identification may be made by detecting a key fob, smart phone, or other electronic device (e.g., corresponding to user device 54 of FIG. 2) as the user is approaching the vehicle, or is the user is entering the vehicle, or just after the user has entered the vehicle, and so on. In certain other embodiments, the identification may be made as the user enters information while inside the vehicle, for example on a touch screen or other input device inside the vehicle.

In certain other embodiments, the identification of 604 is made when the user arranges for use of the vehicle. For example, in certain embodiments, the identification may be made after the user makes a reservation or request for use of a vehicle, for example using a smart phone or other electronic device of the user (e.g. corresponding to the user device 54 of FIG. 2). Also in certain embodiments, a processor (e.g. of the preference-related determination module 420 of FIG. 4 and/or the autonomous vehicle based remote transportation system 52 of FIG. 2) may then assign a particular vehicle for the user, and then pair or much up the user with the assigned vehicle. Also in certain embodiments, a unique identifier representing the user may be sent between the autonomous vehicle based remote transportation system 52 of FIG. 2 and the vehicle 10 of FIGS. 1 and 2 via the communication network 56 of FIG. 2.

Information is received with respect to preferences for the user at 606. In various embodiments, the user preferences of 602 are received at 606 by the preference-related object module 410 of FIG. 4. In certain embodiments, a transceiver 412 and/or other interface of the preference-related object module 410 receives the user preferences via the communication network 56 from a device or system (e.g. the user device 54 or the autonomous vehicle based remote transportation system) that had been storing the user preferences in memory. For example, in certain embodiments, the user preferences are transmitted wirelessly from the user device 54 of FIG. 2 to the preference-related object module 410 of FIG. 4 via the communication network 56 of FIG. 2. In certain other embodiments, the user preferences are transmitted wirelessly from the autonomous vehicle based remote transportation system 52 of FIG. 2 to the preference-related object module 410 of FIG. 4 via the communication network 56 of FIG. 2. Also in certain embodiments, a unique identifier representing the user is sent, along with the user preferences, between the autonomous vehicle based remote transportation system 52 of FIG. 2 and the vehicle 10 of FIGS. 1 and 2 via the communication network 56 of FIG. 2.

Vehicle systems and/or functionality are identified at 608. In various embodiments, certain systems and/or functionality of the vehicle are identified as having control options for selection by the user. In various embodiments, the systems include a climate control system and an entertainment system, among other possible systems. Also in various embodiments, the vehicle systems are identified by the processor 422 of the preference-related determination module 420 of FIG. 4.

Specific user preferences are identified at 610. In various embodiments, certain preferences of the user preferences received at 606 are identified in 610 as pertaining to the identified system of 608. For example, in certain embodiments, if a climate control system needs controlling, then user preferences pertaining to climate control systems are identified (e.g., the climate preferences 510 of FIG. 5, such as the temperature preferences 511, fan preferences 512, recirculation preferences 513, power preferences 514, seat warmer preferences 515, and any other preferences 516 of FIG. 5). Likewise, in certain embodiments, if an entertainment system needs controlling, then user preferences pertaining to entertainment systems are identified (e.g., the entertainment preferences 520 of FIG. 5, such as the current selection(s) 521, stored content 522, radio preferences 523, streaming preferences 524, volume preferences 525, and any other entertainment preferences 526 of FIG. 5), and so on. Also in various embodiments, the specific user preferences are identified by the processor 422 of the preference-related determination module 420 of FIG. 4.

In various embodiments, other conditions are assessed at 612. In various embodiments, the other conditions comprise one or more parameters that may be utilized, in combination with the specific preferences of 610, in controlling the systems of 608. For example, in certain embodiments, ambient temperature values may be obtained via one or more sensors 40a, 40b, . . . 40n of FIG. 1 for analysis by the processor of the preference-related determination module 402 of FIG. 4 for use in controlling the features of the climate control system. In various other embodiments, other parameters may be obtained via sensors (e.g. sensors 40a, 40b, . . . 40n of FIG. 1) and/or received (e.g. via an interface or transceiver of the preference-related object module 410 of FIG. 4 and/or elsewhere on the vehicle 10 of FIG. 1, via the communication network 56 of FIG. 2) from one or more remote source (e.g., via a weather service, and so on). By way of additional example, in certain embodiments one or more vehicle rain sensors may be utilized, for example to trigger the air conditioning unit to dehumidify the vehicle and/or to increase the temperature a little higher than normal (and/or a little higher what the temperature otherwise might have been set).

Settings are determined for the vehicle systems at 614. In various embodiments, the settings are determined by the processor 422 of the preference-related determination module 420 of FIG. 4. Also in various embodiments, settings are determined for the vehicle systems of 608, using the specific user preferences of 610, and in some examples also using the conditions of 612.

For example, in certain embodiments, the settings may be determined at 614 solely from the specific user preferences of 610. For example, in certain embodiments, the settings of 614 may be determined based on one or more user preferences 500 from FIG. 5, such as a temperature setting, a fan setting, a recirculation setting, a power setting, a seat warmer setting, or other setting of a climate control system, and/or a current selection, stored content, radio setting, streaming setting, volume setting, or other setting of an entertainment system, and so on.

In other embodiments, the settings may be determined at 614 using the user preferences of 610 in combination with the conditions of 612. For example, in certain embodiments, the user preferences of 610 may comprise a weighting or adjustment to a typical setting based on the conditions of 614 (e.g. an adjustment to a typical or average setting based also on ambient temperature, and so on). In certain embodiments this may be optional. For example, in certain embodiments the settings may be determined at 614 using the user preferences of 610 without the conditions of 612.

In various embodiments, the settings of 614 serve as an initial, or starting point, for control of the applicable vehicle system(s). For example, in certain embodiments, with respect to a climate control system, the settings of 614 may comprise initial settings of temperature, fan, recirculation, power, seat warmer, or other climate settings (e.g. corresponding to the climate preferences 510 of FIG. 5), which can then be adjusted by the user. Similarly, in certain embodiments, with respect to an entertainment system, the settings of 614 may comprise initiate settings of current selection(s), stored content, radio, streaming, volume, or other entertainment settings (e.g. corresponding to the entertainment preferences 520 of FIG. 5), which can then be adjusted by the user.

In addition, in certain embodiments, the settings of 614 may comprise a menu of possible selections for the user. For example, with respect to the entertainment system example, the settings of 614 may comprise a list of multiple options that all comprise preferences of the user (such as the current selection, various other stored content on the user's device, various radio channel options, various streaming options, various volume options, and the like), and the user can then select from those various options (e.g. the user can then select a particular song from a displayed playlist, or select a particular playlist from a group of displayed playlists, and so on).

The settings are implemented at 616. In various embodiments, the settings of 614 are implemented via instructions that are provided via the processor 422 of the preference-related determination module 420 of FIG. 4 to the applicable system (e.g., the climate control system, the entertainment system, and so on) for operation and control of that particular system. For example, in various embodiments, the settings of 614 are implemented at 614 for those systems. Also in various embodiments, menus or lists of preferred settings are displayed for the user (e.g. on a touch screen display of the vehicle, by way of example) for further selection by the user, and so on.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for implementing user preferences for vehicles, the method comprising:
   receiving preferences of a user with respect to vehicle settings pertaining to a plurality of vehicles, wherein the preferences of the user represent preferred vehicle climate control settings for a vehicle climate control system, as preferred by the user for whenever the user is present within any of the plurality of vehicles; and
   implementing, via instructions provided by a processor, the user's preferences for the vehicle settings, including the user's preferred vehicle climate control settings, whenever a user is set to occupy any vehicle of the plurality of vehicles.

2. The method of claim 1, wherein:
   the plurality of vehicles comprises a fleet of taxis; and
   the step of implementing the user's preferences comprises implementing the same preferences for the user, including the same preferred vehicle climate control settings, whenever the user occupies any of the taxis in the fleet.

3. The method of claim 1, wherein:
   the plurality of vehicles comprises a fleet of autonomous vehicles; and
   the step of implementing the user's preferences comprises implementing the same preferences for the user, including the same preferred vehicle climate control settings, whenever the user occupies any of the autonomous vehicles in the fleet.

4. The method of claim 1, wherein the step of receiving the preferences of the user comprises:
   receiving the preferences of the user, including the user's preferred vehicle climate control settings, from on an electronic device carried by the user, while the user is set to occupy any of the plurality of vehicles.

5. The method of claim 1, wherein:
   the step of receiving the user's preferences comprises receiving one or more preferred vehicle climate control temperature settings for the user for the vehicle climate control system; and
   the step of implementing the user's preferences comprises implementing, via instructions provided by the processor, the user's one or more preferred vehicle climate control temperature settings whenever the user is set to occupy any vehicle of the plurality of vehicles.

6. The method of claim 5, wherein:
   the step of receiving the one or more preferred vehicle climate control temperature settings for the user comprises receiving a most recent temperature setting for a most recent time in which the user has occupied any of the plurality of vehicles; and
   the step of implementing the user's preferences comprises implementing, via instructions provided by the processor, the most recent temperature setting when the user is set to occupy any vehicle of the plurality of vehicles.

7. The method of claim 5, wherein:
   the step of receiving the one or more preferred vehicle climate control temperature settings for the user comprises receiving an average temperature setting for a plurality of times in which the user has occupied any of the plurality of vehicles; and
   the step of implementing the user's preferences comprises implementing, via instructions provided by the processor, the average temperature setting whenever the user is set to occupy any vehicle of the plurality of vehicles.

8. The method of claim 5, wherein:
   the step of receiving the one or more preferred vehicle climate control temperature settings for the user comprises receiving a weighting factor for the user, representing the user's preferences as to a relatively colder or warmer temperature in relation to an outside ambient temperature as compared with other users, and
   the step of implementing the user's preferences comprises implementing, via instructions provided by the processor, the weighting factor for the user whenever the user is set to occupy any vehicle of the plurality of vehicles.

9. The method of claim 1, wherein:
the step of receiving the user's preferences comprises receiving one or more preferred vehicle climate control fan settings for the user for the vehicle climate control system; and
the step of implementing the user's preferences comprises implementing, via instructions provided by the processor, the user's one or more preferred vehicle climate control fan settings whenever the user is set to occupy any vehicle of the plurality of vehicles.

10. The method of claim 1, wherein:
the step of receiving the user's preferences comprises receiving one or more preferred seat warmer settings; and
the step of implementing the user's preferences comprises implementing, via instructions provided by the processor, the user's one or more preferred seat warmer settings whenever the user is set to occupy any vehicle of the plurality of vehicles.

11. The method of claim 1, wherein:
the step of receiving the user's preferences comprises receiving one or more of the following: preferred vehicle climate control temperature settings, preferred vehicle climate control fan settings, or preferred vehicle seat warmer settings, for the user; and
the step of implementing the user's preferences comprises implementing, via instructions provided by the processor, one or more of the preferred vehicle climate control temperature settings, preferred vehicle climate control fan settings, or preferred vehicle seat warmer settings, for the user, whenever the user is set to occupy any vehicle of the plurality of vehicles.

12. The method of claim 1, wherein:
the step of receiving the user's preferences comprises receiving each of the following: preferred vehicle climate control temperature settings, preferred vehicle climate control fan settings, and preferred vehicle seat warmer settings, for the user; and
the step of implementing the user's preferences comprises implementing, via instructions provided by the processor, each of the preferred vehicle climate control temperature settings, preferred vehicle climate control fan settings, and preferred vehicle seat warmer settings, for the user, whenever the user is set to occupy any vehicle of the plurality of vehicles.

13. A system for implementing user preferences for a plurality of vehicles, the system comprising:
a preference-related object module configured to receive preferences of a user with respect to vehicle settings pertaining to the plurality of vehicles, wherein the preferences of the user represent preferred vehicle climate control settings for a vehicle climate control system, as preferred by the user for whenever the user is present within any of the plurality of vehicles; and
a preference-related determination module, including a processor, configured to implement the user's preferences for the vehicle settings, including the user's preferred vehicle climate control settings, whenever a user is set to occupy any vehicle of the plurality of vehicles.

14. The system of claim 13, wherein:
the plurality of vehicles comprises a fleet of taxis; and
the preference-related determination module is configured to implement the user's preferences comprises implementing the same preferences for the user, including the same preferred vehicle climate control settings, whenever the user occupies any of the taxis in the fleet.

15. The system of claim 13, wherein:
the plurality of vehicles comprises a fleet of autonomous vehicles; and
the preference-related determination module is configured to implement the same preferences for the user, including the same preferred vehicle climate control settings, whenever the user occupies any of the autonomous vehicles in the fleet.

16. The system of claim 13, wherein the preference-related object module is configured to the receive the preferences for the user, including the user's preferred vehicle climate control settings, from a memory of an electronic device carried by the user, as the user is set to occupy any of the plurality of vehicles.

17. An autonomous vehicle, comprising:
an interface configured to receive preferences of a user with respect to vehicle settings pertaining to a plurality of vehicles, wherein the autonomous vehicle comprises one of the plurality of vehicles, and wherein the preferences of the user represent preferred vehicle climate control settings for a vehicle climate control system, as preferred by the user for whenever the user is present within any of the plurality of vehicles; and
a controller configured to implement the user's preferences for the vehicle settings, including the user's preferred vehicle climate control settings, whenever a user is set to occupy the autonomous vehicle.

18. The autonomous vehicle of claim 17, wherein:
the plurality of vehicles comprises a fleet of taxis; and
the controller is configured to implement the same preferences for the user, including the same preferred vehicle climate control settings, whenever the user occupies any of the taxis in the fleet.

19. The autonomous vehicle of claim 17, wherein the interface is configured to the receive preferences for the user, including the user's preferred vehicle climate control settings, from a memory of an electronic device carried by the user, as the user is set to occupy the autonomous vehicle.

20. The autonomous vehicle of claim 17, wherein:
the interface is configured to receive one or more of the following: preferred vehicle climate control temperature settings, preferred vehicle climate control fan settings, or preferred vehicle seat warmer settings, for the user; and
the controller is configured to provide instructions for implementing one or more of the preferred vehicle climate control temperature settings, preferred vehicle climate control fan settings, or preferred vehicle seat warmer settings, for the user, whenever the user is set to occupy any vehicle of the plurality of vehicles.

* * * * *